United States Patent
Rueger et al.

(10) Patent No.: US 10,798,102 B2
(45) Date of Patent: Oct. 6, 2020

(54) PROTECTING DATA AT AN OBJECT LEVEL

(71) Applicant: International Business Machines Corporation, Armonk, NY (US)

(72) Inventors: Erik Rueger, Mainz (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 15/812,927

(22) Filed: Nov. 14, 2017

(65) Prior Publication Data

US 2019/0149554 A1 May 16, 2019

(51) Int. Cl.
*H04L 29/06* (2006.01)
*G06F 21/62* (2013.01)
*G06N 3/04* (2006.01)
*G06N 3/08* (2006.01)
*G06F 21/78* (2013.01)
*H04L 29/08* (2006.01)
*H04L 12/58* (2006.01)

(52) U.S. Cl.
CPC ........ *H04L 63/105* (2013.01); *G06F 21/6218* (2013.01); *G06F 21/6245* (2013.01); *G06F 21/78* (2013.01); *G06N 3/04* (2013.01); *G06N 3/08* (2013.01); *H04L 51/22* (2013.01); *H04L 67/1097* (2013.01); *H04L 67/12* (2013.01)

(58) Field of Classification Search
CPC ... H04L 63/105; H04L 67/1097; H04L 51/22; H04L 67/12; G06F 21/6245; G06F 21/78; G06F 21/6218; G06N 3/04; G06N 3/08
See application file for complete search history.

(56) References Cited

U.S. PATENT DOCUMENTS

| | | | | |
|---|---|---|---|---|
| 6,298,401 B1 * | 10/2001 | Anderson | ............. | G06F 3/0607 707/999.103 |
| 7,383,294 B1 * | 6/2008 | Tamer | ..................... | G06F 16/10 707/810 |
| 8,700,571 B2 * | 4/2014 | Rogers | ................ | G06F 11/2094 707/640 |
| 9,432,344 B2 | 8/2016 | Diamond et al. | | |
| 2002/0099959 A1 * | 7/2002 | Redlich | ............... | H04L 63/0428 726/23 |
| 2006/0053088 A1 * | 3/2006 | Ali | ...................... | G06F 11/1448 |

(Continued)

FOREIGN PATENT DOCUMENTS

EP     1999584 B1     7/2016

OTHER PUBLICATIONS

OpenStack, "Welcome to Swift's documentation!" 2017, 4 pages, retrieved from http://docs.openstack.org/developer/swift/overview_erasure_code.html.

(Continued)

*Primary Examiner* — Khoi V Le
(74) *Attorney, Agent, or Firm* — Zilka-Kotab, P.C.

(57) ABSTRACT

A computer-implemented method according to one embodiment includes identifying an object within a system, determining metadata associated with the object, calculating a logical protection level for the object, utilizing the metadata, and implementing a physical protection level for the object within the system, utilizing the logical protection level for the object.

16 Claims, 8 Drawing Sheets

(56) References Cited

U.S. PATENT DOCUMENTS

2006/0053334 A1\* 3/2006 Ingen ................. G06F 11/1466
714/2
2007/0079081 A1 4/2007 Gladwin et al.
2015/0286701 A1\* 10/2015 Wideman ............. G06F 16/285
707/737

OTHER PUBLICATIONS

Cleversafe, "The Definitive Guide to Dispersed Storage," Cleversafe White Paper, 2015, pp. 1-30.
NIST, "NIST Cloud Computing Program," NIST webpage, http://www.nist.gov/itl/cloud/, Dec. 9, 2013, 2 pages.
Mell et al., "The NIST Definition of Cloud Computing: Special Publication 800-145," National Institute of Standards and Technology, Sep. 2011, 7 pages.
Mell et al., "The NIST Definition of Cloud Computing: Version 15," National Institute of Standards and Technology, Oct. 7, 2009, 2 pages.
Google, "Working With Object Metadata," Google Cloud Platform, Jun. 2017, pp. 1-5, retrieved from https://cloud.google.com/storage.docs.gsutil/addhelp/WorkingWithObjectMetadata.
Feng et al., "BLESS: Object level encryption security for object-based storage system," Mathematical and Computer Modelling, vol. 55, 2012, pp. 188-197.

\* cited by examiner

PROTECTING DATA AT AN OBJECT LEVEL

BACKGROUND

The present invention relates to data protection, and more specifically, this invention relates to determining and implementing data protection within a data storage environment.

Data protection is an important part of data storage. For example, data storage systems implement various hardware and software data protection techniques to protect data in case of system or component failure, data corruption, etc. However, determining which protection technique to implement for data is currently a time and resource-intensive process, and is implemented very coarsely at a high level.

SUMMARY

A computer-implemented method according to one embodiment includes identifying an object within a system, determining metadata associated with the object, calculating a logical protection level for the object, utilizing the metadata, and implementing a physical protection level for the object within the system, utilizing the logical protection level for the object.

According to another embodiment, a computer program product for protecting data at an object level includes a computer readable storage medium having program instructions embodied therewith, where the computer readable storage medium is not a transitory signal per se, and where the program instructions are executable by a processor to cause the processor to perform a method including identifying an object within a system, utilizing the processor, determining metadata associated with the object, utilizing the processor, calculating, utilizing the processor, a logical protection level for the object, utilizing the metadata, and implementing, utilizing the processor, a physical protection level for the object within the system, utilizing the logical protection level for the object.

A system according to another embodiment includes a processor, and logic integrated with the processor, executable by the processor, or integrated with and executable by the processor, where the logic is configured to identify an object within a system, determine metadata associated with the object, calculate a logical protection level for the object, utilizing the metadata, and implement a physical protection level for the object within the system, utilizing the logical protection level for the object.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for protecting data at an object level. Various embodiments provide a method for determining and implementing a physical protection level for an object, based on a logical protection level calculated for the object based on object metadata.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for protecting data at an object level.

In one general embodiment, a computer-implemented method includes identifying an object within a system, determining metadata associated with the object, calculating a logical protection level for the object, utilizing the metadata, and implementing a physical protection level for the object within the system, utilizing the logical protection level for the object.

In another general embodiment, a computer program product for protecting data at an object level includes a computer readable storage medium having program instructions embodied therewith, where the computer readable storage medium is not a transitory signal per se, and where the program instructions are executable by a processor to cause the processor to perform a method including identifying an object within a system, utilizing the processor, determining metadata associated with the object, utilizing the processor, calculating, utilizing the processor, a logical protection level for the object, utilizing the metadata, and implementing, utilizing the processor, a physical protection level for the object within the system, utilizing the logical protection level for the object.

In another general embodiment, a system includes a processor, and logic integrated with the processor, executable by the processor, or integrated with and executable by the processor, where the logic is configured to identify an object within a system, determine metadata associated with the object, calculate a logical protection level for the object, utilizing the metadata, and implement a physical protection level for the object within the system, utilizing the logical protection level for the object.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
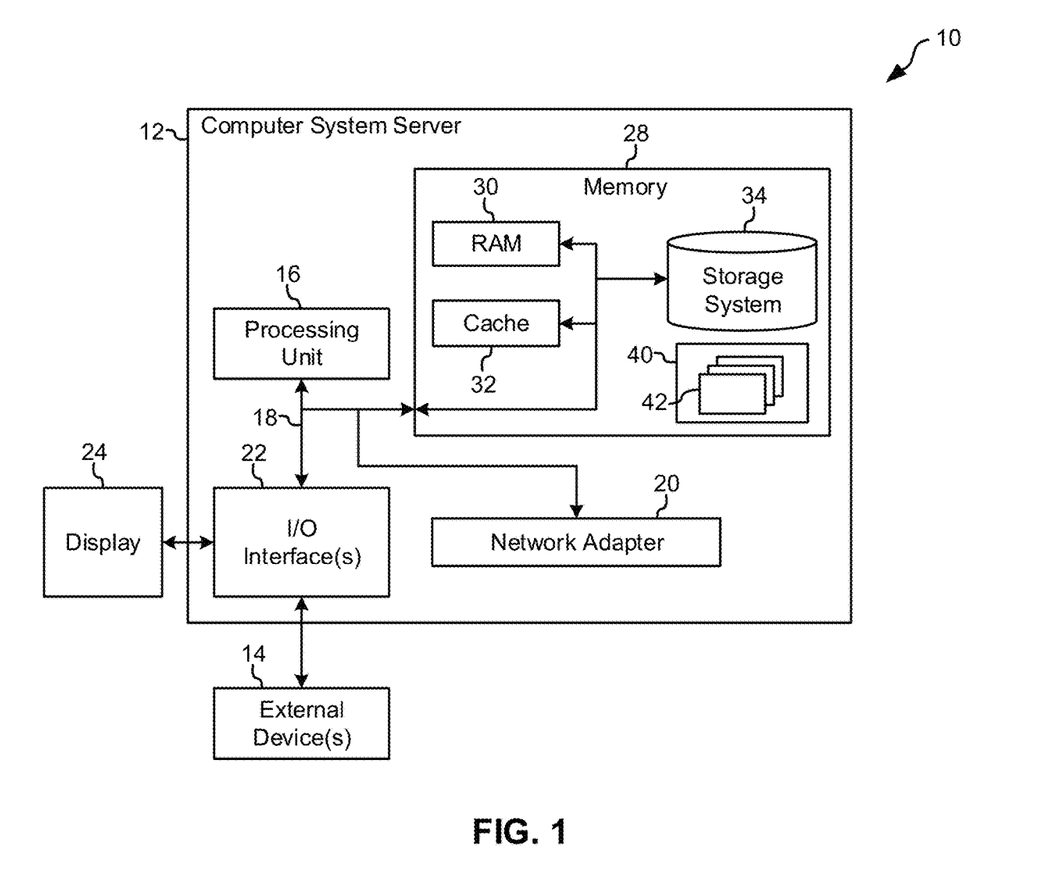
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
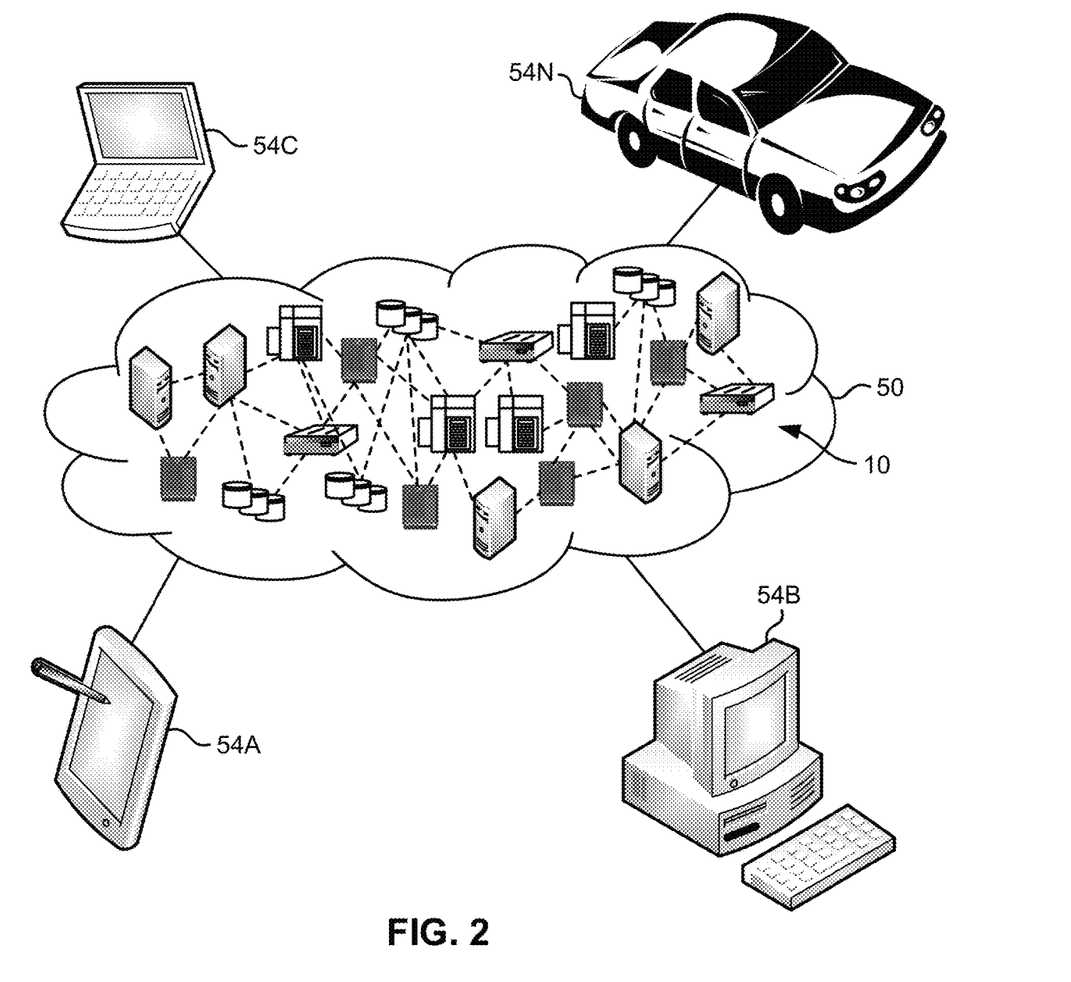
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
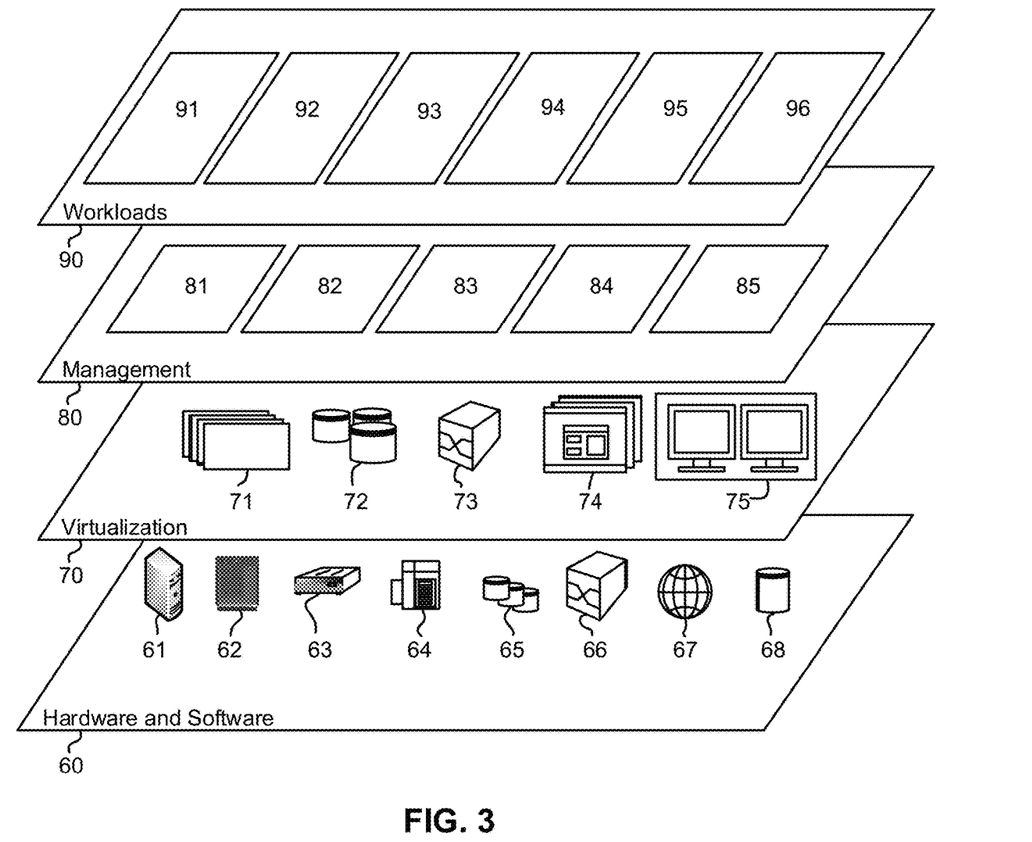
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
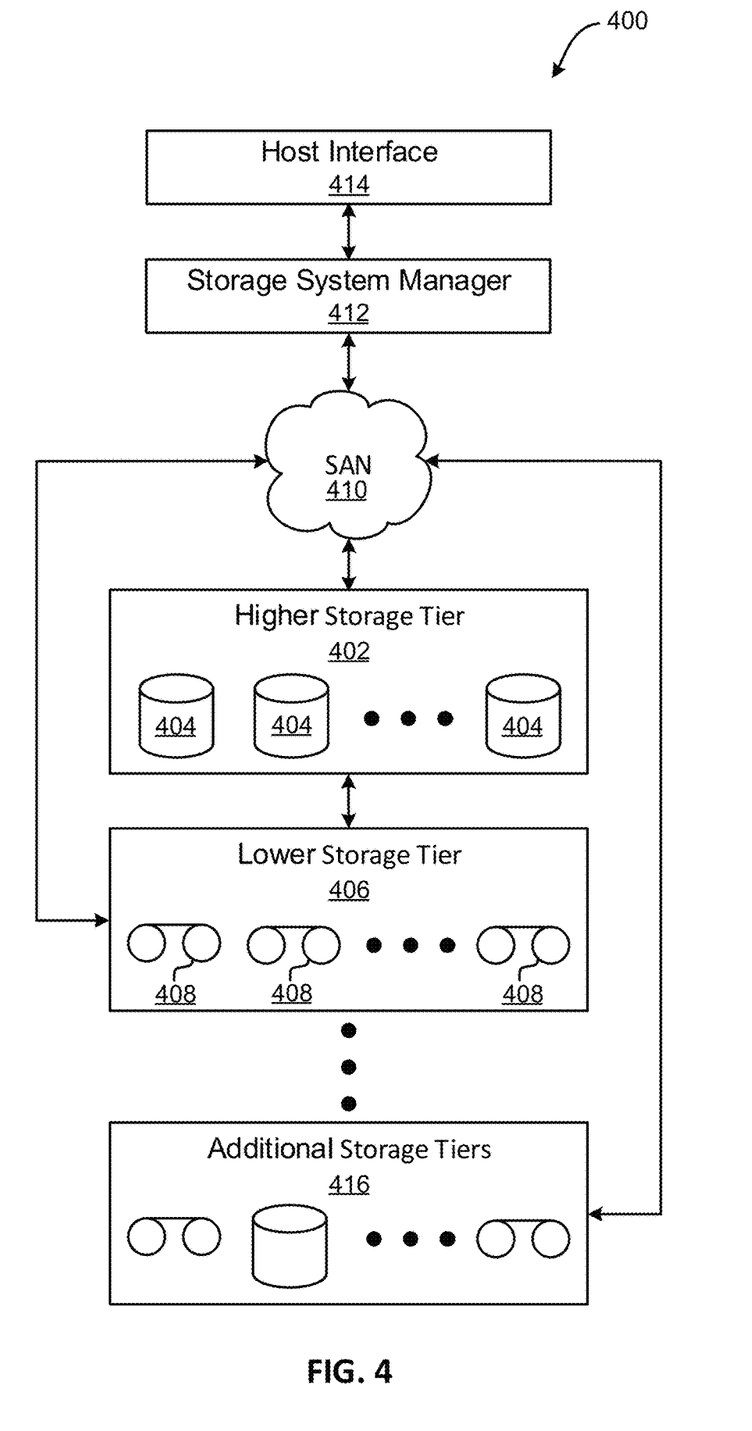
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
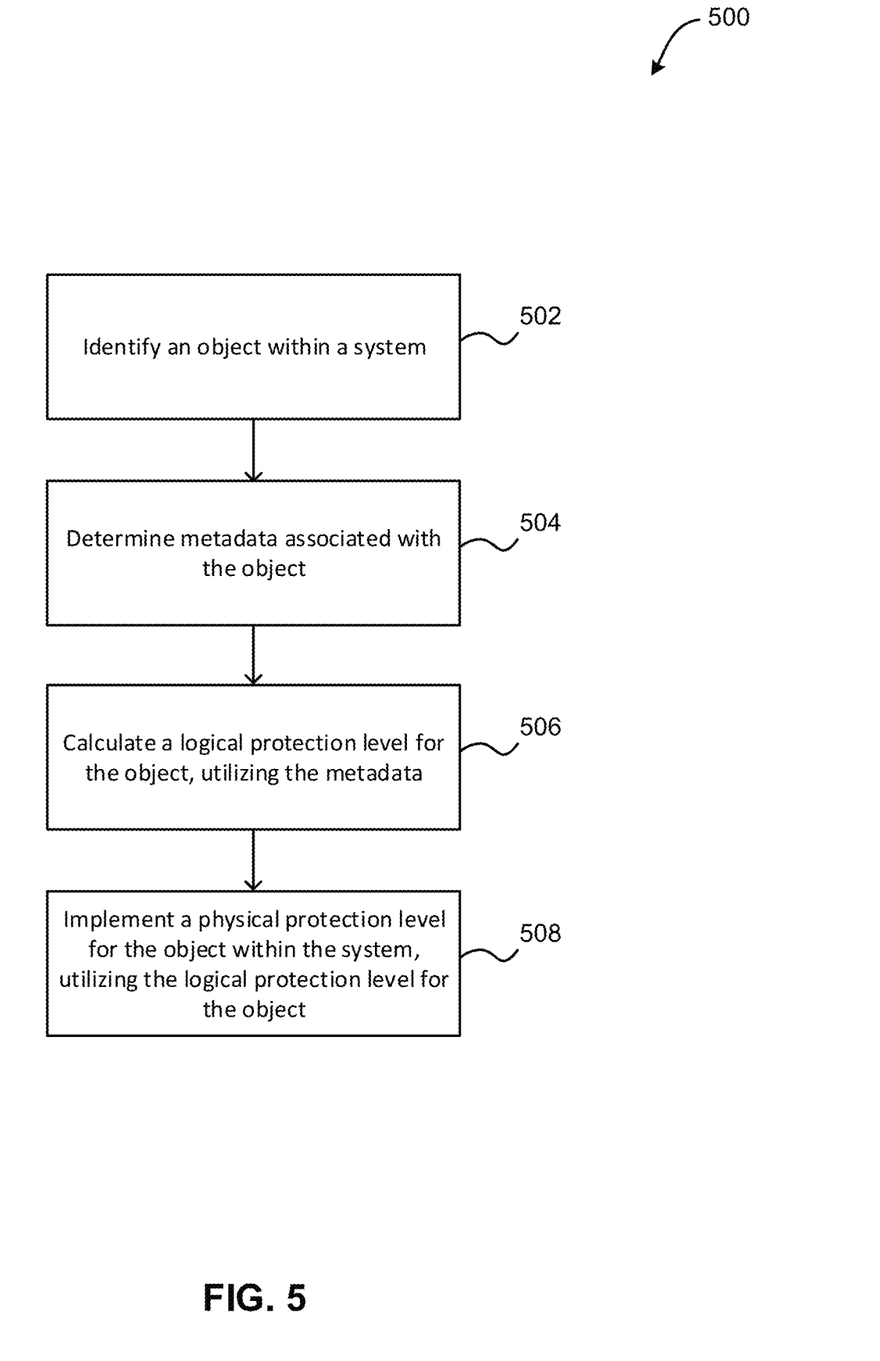
FIG. 5 illustrates a flowchart of a method for protecting data at an object level, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an object is identified within a system. In one embodiment, the system may include one or more computing devices, a cloud computing environment, etc. For example, the system may include a data storage system that includes a plurality of storage devices (e.g., a database system, etc.). In another embodiment, the system may include an object storage system (e.g., a storage architecture that manages data as objects). For example, the system may include a cloud-based object storage system. In another example, the system may include a network attached storage (NAS) system.

Additionally, in one embodiment, the object may include any type of unstructured data stored within the system. For example, the object may include one or more of audio data, picture data, video data, textual data, etc. In another embodiment, the object may be identified in response to a request to store the object within the system. In yet another embodiment, the object may be identified in response to a request to access or move the object within the system.

Further, method 500 may proceed with operation 504, where metadata associated with the object is determined. In one embodiment, the metadata may be stored in association with the object. In another embodiment, the metadata may be extracted by identifying one or more characteristics of the object. For example, the metadata may include a time and/or date of a creation of the object, a time and/or date of an accessing of the object, a time and/or date of a modifying of the object, etc.

Further still, in one example, the metadata may include one or more identifiers (e.g., names, etc.) of data within the object. In another example, the metadata may include a file extension for data within the object, a size of the object, etc. In yet another example, the metadata may include a user ID and/or group ID associated with the object. For example, the metadata may include an ID of a user or group that created the object, uploaded the object, modified the object, etc.

Also, in one example, the metadata may include a user defined protection level. In another example, the metadata may include a location associated with the object (e.g., a GPS location associated with a location where the object was created, etc.). In yet another example, the metadata may include a folder in which the object is currently stored, a multipurpose internet mail extensions (MIME) type of the object, etc.

In addition, method 500 may proceed with operation 506, where a logical protection level is calculated for the object, utilizing the metadata. In one embodiment, the logical protection level may indicate an importance of the data. In another embodiment, the logical protection level may indicate a level of security to be implemented for the data. In yet another embodiment, the logical protection level may be selected from a plurality of predetermined levels. For example, the logical protection level may include a numerical rank (e.g., 1-10, etc.), may include a textual indicator (e.g., "high," "medium," "low," etc.), etc.

Furthermore, in one embodiment, the metadata may be analyzed, and the logical protection level may be determined, based on the analysis. In another embodiment, the metadata may be compared to predetermined criteria, and may be assigned one of a plurality of logical protection levels when predetermined metadata (or combinations of metadata) are identified. In yet another embodiment, the logical protection level may be determined manually by a user (e.g., a user having an authority level within the system that allows the assignment of a logical protection level to an object, etc.).

Further still, in one embodiment, the logical protection level may be determined dynamically. For example, the logical protection level may be determined using machine learning (e.g., an artificial neural network (ANN), etc.). For instance, the ANN may be trained using training data and manual annotations. After training, the ANN may take the metadata as input and produce the logical protection level for the data as output.

Also, method 500 may proceed with operation 508, where a physical protection level is implemented for the object within the system, utilizing the logical protection level for the object. In one embodiment, the physical protection level may be identified based on a predetermined mapping. For example, the predetermined mapping may map each of a plurality of logical protection levels to one of a plurality of physical protections levels. In this way, an object having a predetermined logical protection level may be stored utilizing one or more data storage techniques associated with a physical protection level linked to that logical protection level.

Additionally, in one embodiment, the physical protection level may be implemented for the object utilizing or more data storage techniques within the system. For example, the data storage techniques may include a hardware level of protection (e.g., a type of hardware RAID to be used to store the object within the system, etc.). In another example, the data storage techniques may include a software level of protection (e.g., a type of software RAID to be used to store the object, etc.). In yet another example, the data storage techniques may include both a hardware-level and a software-level type of protection (e.g., a type of erasure code to be used to store the object as well as hardware storage necessary to implement the type of erasure code, etc.).

Further, in one embodiment, the predetermined mapping may be adjusted. For example, the predetermined mapping may be adjusted manually, dynamically based on machine learning, etc. In another embodiment, implementing the physical protection level for the object may include storing the object within the system, utilizing the data storage technique associated with the physical protection level. For example, the object data may be stored within the system in a RAID configuration indicated by the physical protection level (using hardware or software RAID, etc.). In another example, the object data may be stored within the system utilizing an erasure code indicated by the physical protection level.

In this way, data protection may be defined at an object level instead of a higher level within the system.

Figure 6:
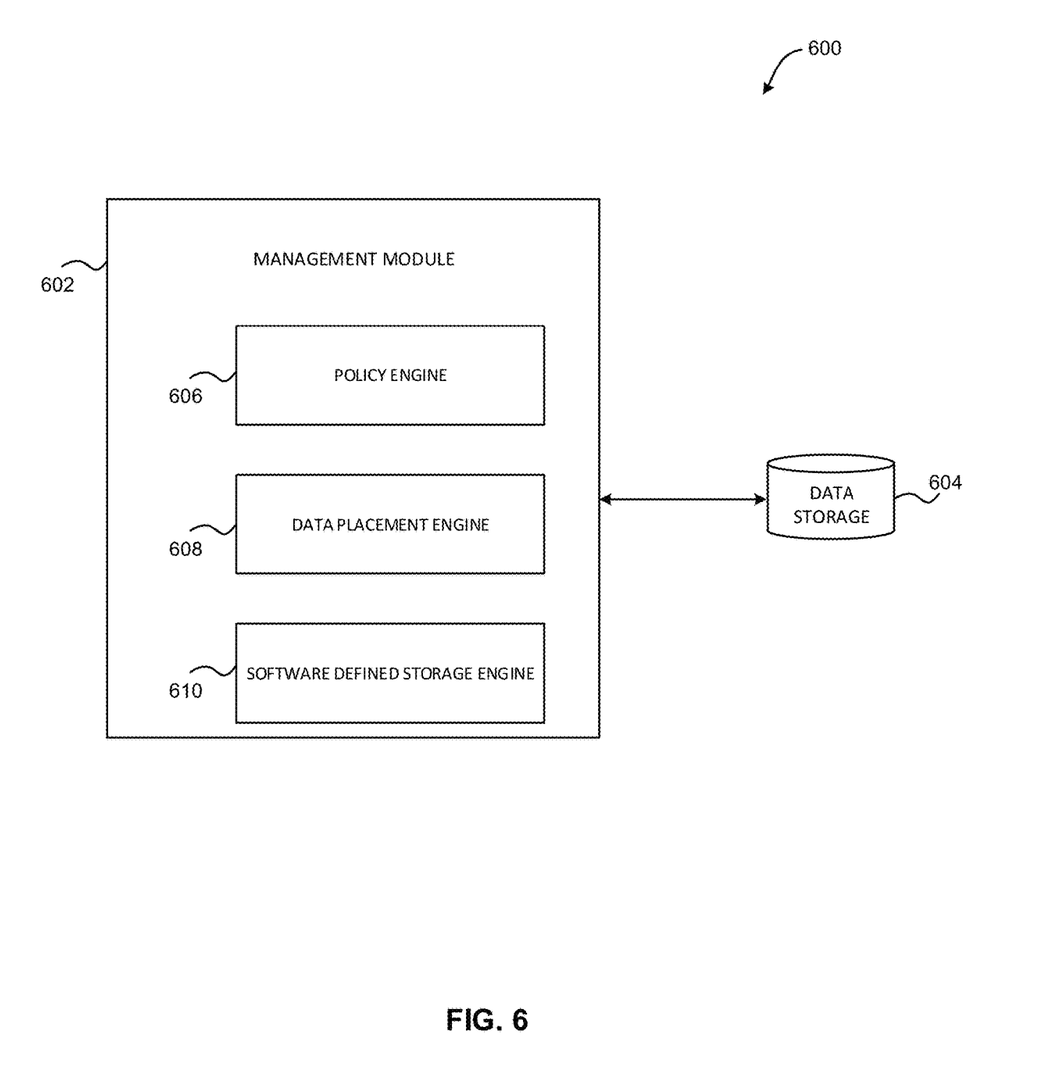
FIG. 6 illustrates an exemplary storage environment that implements object level protection, in accordance with one embodiment.

FIG. 6 illustrates an exemplary storage environment 600 that implements object level protection, according to one embodiment. As shown, the storage environment 600 includes a management module 602 in communication with data storage 604. In one embodiment, the storage environment 600 may include a local storage environment, a remote storage environment, a cloud-based storage environment, etc. In another embodiment, the storage environment 600 may include an object-based storage environment.

Additionally, in one embodiment, the data storage 604 may include one or more hardware storage devices (e.g., flash storage, hard disk drive (HDD) storage, tape drive storage, etc.). In another embodiment, the data storage 604 may include storage in a redundant array of independent disks (RAID) format.

Further, in one embodiment, the management module 602 may control a process flow to define a logical protection level for an object stored within the storage environment 600. In another embodiment, the management module 602 may create one or more physical protection levels for objects stored within the storage environment 600. In yet another embodiment, the management module 602 may map the logical protection level for the objects to one of the physical protection levels, and may store the object within the data storage 604 according to the mapped physical protection level.

Further, as shown, the management module 602 includes a policy engine 606, a data placement engine 608, and a software defined storage engine 610. In one embodiment, the policy engine 606 may provide a definition for each of a plurality of logical protection levels for objects stored within the storage environment 600. For example, the policy engine 606 may indicate the metadata that an object is required to have in order for that object to be assigned a particular logical protection level.

For example, the policy engine 606 may indicate that an object determined to be part of a first predetermined folder (e.g., a folder flagged as "important," etc.) may be assigned a first predetermined logical protection level (e.g., "High," etc.) within a logical protection level definition. In another example, an object determined to be part of a second predetermined folder (e.g., a folder flagged as "temp," etc.) may be assigned a second predetermined logical protection level (e.g., "Low," etc.) within a logical protection level definition. In yet another example, an object having metadata indicating that it is confidential may be assigned a predetermined logical protection level (e.g., "Medium," etc.) within a logical protection level definition.

Also, in one example, the policy engine 606 may indicate that objects created by a first type of user (e.g., a home-based user, etc.) may have a lower logical protection level than objects created by a second type of user (e.g., a business-based user, etc.). In another example, the policy engine 606 may indicate that objects having a first predetermined file extension (e.g., an ".exe" or ".dll" file extension, etc.) may have a lower logical protection level than objects having a second predetermined file extension (e.g., an ".xls" or ".doc" file extension, etc.).

Further still, in one embodiment, the policy engine 606 may provide a definition for each of a plurality of physical protection levels to be used to store data within the storage environment 600. For example, the policy engine 606 may define the physical protection levels using one or more data storage techniques (e.g., specific erasure code implementation, specific RAID level, a specific number of variables and equations, or other physical data protection implementation).

In another embodiment, the data storage techniques may include a hardware RAID storage technique, where a set of hardware storage devices are managed by a RAID controller. In yet another embodiment, the data storage techniques may include a software RAID storage technique, where a set of HDDs are run on a host, where a software stack runs on the host and manages the hardware storage devices directly without a dedicated hardware RAID controller. For example, the hardware storage devices may be connected via JBOD (just a bunch of disks) frames. In another example, within the software RAID storage technique, RAID protection levels may be defined within each array/storage pool. In yet another example, fixed capacity pools may be defined, and each data block in a pool may have the RAID definition of the pool. In still another embodiment, the data storage techniques may include a cloud-based object storage technique that defines a number of variables and equations within coding to be used to store an object within the storage environment 600.

Also, in one embodiment, the policy engine 606 may provide one or more mappings between defined logical protection levels and defined physical protection levels. Table 1 illustrates an exemplary lookup table that maps defined logical protection levels to defined erasure code levels, in accordance with one embodiment. Of course, it should be noted that the exemplary lookup table shown in Table 1 is set forth for illustrative purposes only, and thus should not be construed as limiting in any manner.

TABLE 1

| Logical Protection Level | Erasure Code Level (# variables, # equations) |
| --- | --- |
| High | 8.7 |
| Medium | 6.5 |
| Low | 5.4 |
| Unknown | 6.4 |

Table 2 illustrates an exemplary lookup table that maps defined logical protection levels to defined RAID levels, in accordance with one embodiment. Of course, it should be noted that the exemplary lookup table shown in Table 2 is set forth for illustrative purposes only, and thus should not be construed as limiting in any manner.

TABLE 2

| Logical Protection Level | RAID Level |
| --- | --- |
| High | 1 |
| Medium | 6 |
| Low | 5 |
| Unknown | 1 |

In addition, in one embodiment, the data placement engine 608 may determine an associated physical protection level for an object, utilizing the information provided by the policy engine 606 and an identification of metadata associated with the object. For example, the data placement engine 608 may identify an object, determine its associated metadata, and calculate a logical protection level for the object, based on the metadata. In another example, the data placement engine 608 may compare the logical protection level for the object to a lookup table provided by the policy engine 606 in order to determine an associated physical protection level for the object.

Furthermore, in one embodiment, if a logical protection level cannot be calculated for an object, the object may be assigned an "unknown" logical protection level (which may have an associated physical protection level within the lookup table). In another embodiment, the data placement engine 608 may store the object within the data storage 604, utilizing the associated physical protection level for the object. For example, the data placement engine 608 may store the related blocks/segments for the object, utilizing the associated physical protection level for the object and the services of the software defined storage engine 610.

Further still, in one embodiment, the data placement engine 608 may migrate the object from one physical protection level to another different physical protection level, based on an identified change in the logical protection level for the object. For example, the logical protection level for the object may change in response to a change in metadata for the object, an updated definition for one or more logical protection levels by the policy engine 606, etc.

Also, in one embodiment, the software defined storage engine 610 may implement object storage within the data storage 604, according to the associated physical protection level for the object. For example, the software defined storage engine 610 may create and maintain a physical storage layer, and may enable the data placement engine 608 to store object data within mapped physical layers of the physical storage layer.

In another embodiment, the software defined storage engine 610 may also handle errors within the physical storage layer. For example, in case of a HDD failure within the data storage 604, the software defined storage engine 610 may ensure that data is recovered based on the associated physical protection levels for objects stored within the data storage 604, and may also make sure that storage redundancy is reaches again based on the associated physical protection levels.

Additionally, in one embodiment, the software defined storage engine 610 may receive object data from the management module 602, along with the associated physical protection level for the object. For example, in the case of a RAID system, the RAID level used to store an object may be derived from the associated physical protection level for the object, and may determine how stripes of block storage are allocated (e.g., 2 stripes to form a mirrored block, 5 stripes for a 4+P RAID 5, 11 stripes for a 8+3P RAID 6, etc.). The distribution of user data to these stripes may be performed by the software defined storage engine 610 as indicated by the RAID implementation for the object.

In another embodiment, the allocation of these blocks may be on demand per incoming object (e.g., rather than fixed pools, etc.). In yet another embodiment, free block and block chain management may be applied by the software defined storage engine 610 to keep track of used and unused blocks.

In this way, object protection may be defined on an object level instead of on a storage array/storage pool level. This may increase a flexibility of data protection within the system, and may reduce unnecessary copies of data, which may increase available storage space within the system.

Figure 7:
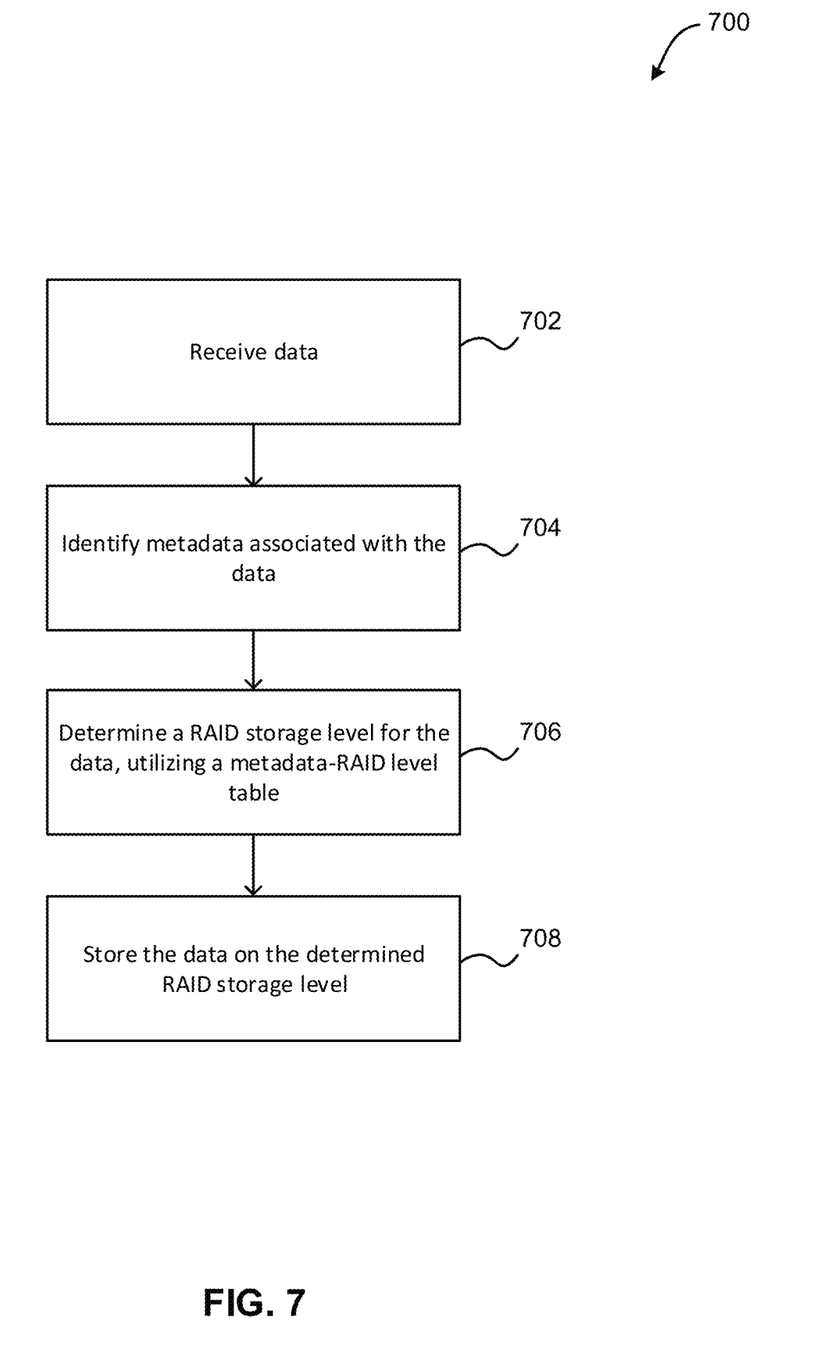
FIG. 7 illustrates a flowchart of a method for implementing object-level defined protection with a RAID based storage system, in accordance with one embodiment.

Now referring to FIG. 7, a flowchart of a method 700 for implementing object-level defined protection with a RAID based storage system is shown, according to one embodiment. The method 700 may be performed in accordance with the present invention in any of the environments depicted in FIGS. 1-4 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where data is received. In one embodiment, the data may include object data (e.g., data describing the object, etc.). In another embodiment, the data may include metadata describing one or more characteristics of the object. Additionally, method 700 may proceed with operation 704, where metadata associated with the data is identified. Further, method 700 may proceed with operation 706, where a RAID storage level for the data is determined, utilizing a metadata-RAID level table. For example, the identified metadata may be compared to the metadata-RAID level table in order to determine a RAID storage level for the data. Further, method 700 may proceed with operation 708, where the data is stored on the determined RAID storage level.

In one embodiment, the RAID storage level for the data may include RAID 1 storage. For example, for a 2-block object with RAID 1 storage, each block may be copied to another HDD within hardware storage. In another embodiment, the RAID storage level for the data may include RAID 5 storage. For example, for a 2-block object with RAID 5 storage, parity information may be stored on a separate HDD within hardware storage. In yet another embodiment, the RAID storage level for the data may include RAID 6 storage. For example, for a 2-block object with RAID 6 storage, two independent parity blocks may be calculated and stored on separate HDDs within hardware storage.

In this way, objects may be stored using an object-centric protection level within an object storage system. This may improve flexibility for users with respect to object data protection, and also for general storage capacity usage, by avoiding a need to define a fixed protection level for a predetermined storage pool. Additionally, required storage space may be reduced within a storage system by eliminating unnecessary security copies for objects. Further, protection of objects deemed important within a storage system may be improved.

Figure 8:
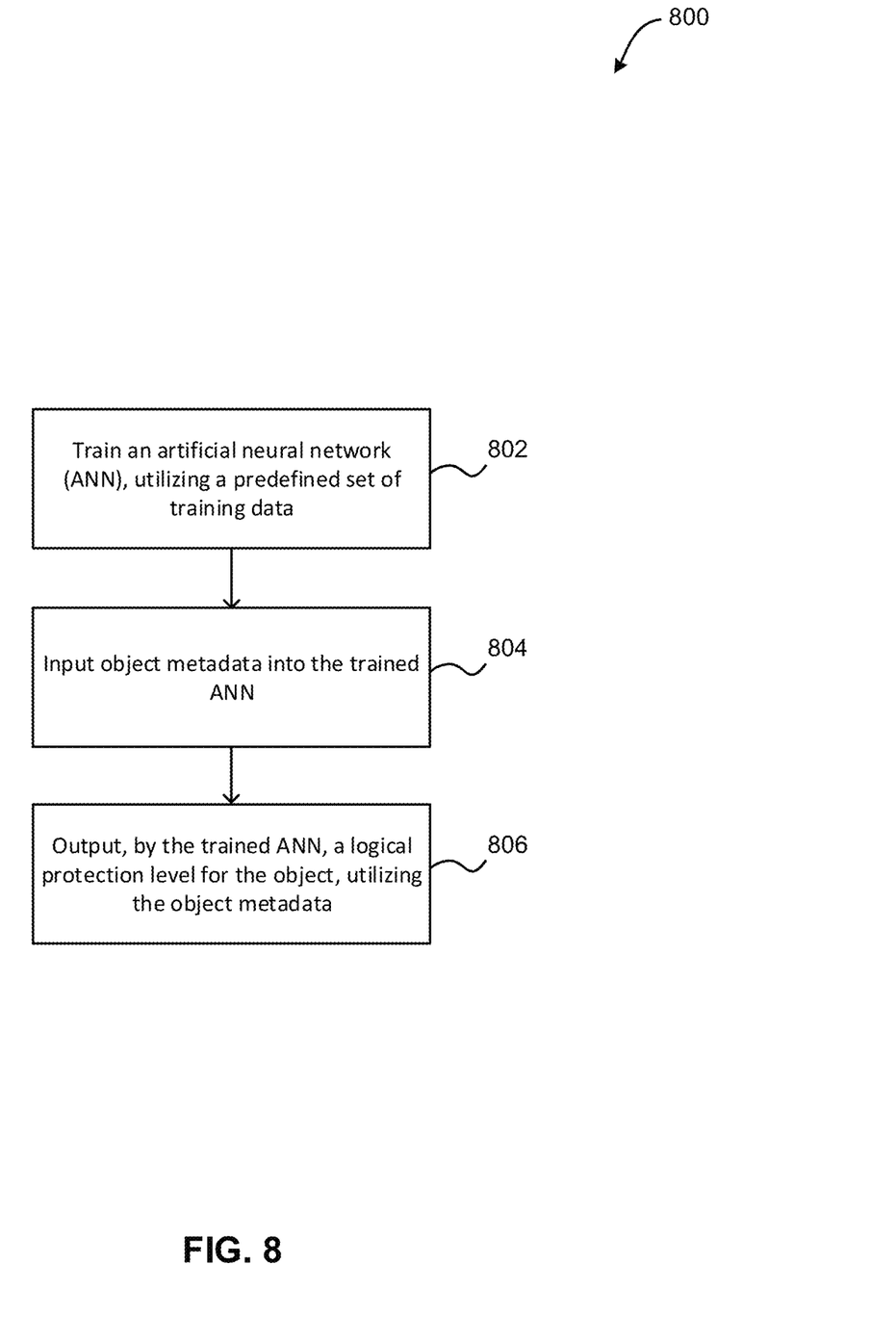
FIG. 8 illustrates a method for training an artificial neural network (ANN) to determine a logical protection level for an object, in accordance with one embodiment.

Now referring to FIG. 8, a flowchart of a method 800 for training an artificial neural network (ANN) to determine a logical protection level for an object is shown, according to one embodiment. The method 800 may be performed in accordance with the present invention in any of the environments depicted in FIGS. 1-4 and 6, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where an artificial neural network (ANN) is trained, utilizing a predefined set of training data. In one embodiment, the ANN may include a supervised machine learning environment. In another embodiment, the ANN may be trained to determine a logical protection level for an object. In yet another embodiment, the predefined set of training data may include object data, as well as annotation data that has been manually added to the object data. For example, the annotation data may include a logical protection level for an object that was determined manually for the object.

Additionally, in one embodiment, the predefined set of training data may be applied to the ANN. In another embodiment, the predefined set of training data may include one or more weights. For example, newer annotation data may be weighted more than older annotation data. In response, the ANN may determine one or more internal weightings to be used during classification, such that newer data may have a stronger impact during training. In another embodiment, metadata associated with an object may define an input vector into the ANN. A user may provide a classification of the logical protection level for the object, and the ANN may be trained, using this information.

Further, in one embodiment, training data sets may be generated by user defined examples to allow the training of the ANN. One exemplary goal may be to get the system trained to separate the training data in different groups (e.g., classes, etc.). This separation may be based on the metadata of the individual object as well as pre-annotated training data. The ANN model may then be used to manage data protection within a system, and protect the data based on a data classification using individual object metadata.

Further still, method 800 may proceed with operation 804, where object metadata is input into the trained ANN. Also, method 800 may proceed with operation 806, where the trained ANN outputs a logical protection level for the object, utilizing the object metadata. In one embodiment, the ANN may be included within the storage system in which it is implemented. For example, the object may be stored in a storage system in which the ANN is located. In another embodiment, the ANN may be external from the storage system in which it is implemented, and may be shared with other different systems. In this way, the ANN may learn from the behavior of other different systems and may apply that learning to a current system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying an object within a system;
   extracting metadata associated with the object by identifying one or more characteristics of the object;
   providing as input, to an artificial neural network (ANN), the metadata associated with the object;
   receiving as output, from the ANN, a logical protection level for the object;
   identifying a predetermined mapping between the logical protection level and a physical protection level;
   identifying the physical protection level for the object within the system, based on the predetermined mapping; and
   implementing, via data storage techniques including a hardware level of protection and a software level of protection, the physical protection level for the object within the system, based on the logical protection level for the object.

2. The computer-implemented method of claim 1, wherein the metadata includes:
   a time and date of a creation of the object;
   a time and date of an accessing of the object; and
   a time and date of a modifying of the object.

3. The computer-implemented method of claim 1, wherein the metadata includes:
   one or more identifiers of data within the object;
   a file extension for data within the object;
   a size of the object;
   a user ID associated with the object; and
   a group ID associated with the object.

4. The computer-implemented method of claim 1, wherein the metadata includes:
   a user defined protection level;
   a location associated with the object;
   a folder in which the object is currently stored; and
   a multipurpose internet mail extensions (MIME) type of the object.

5. The computer-implemented method of claim 1, wherein the logical protection level indicates a level of security to be implemented for the object.

6. The computer-implemented method of claim 1, wherein the metadata includes:
   a time and date of a creation of the object,
   a time and date of an accessing of the object,
   a time and date of a modifying of the object,
   one or more identifiers of data within the object,
   a file extension for data within the object,
   a size of the object,
   a user ID associated with the object,
   a group ID associated with the object,
   a user defined protection level,
   a location associated with the object,
   a folder in which the object is currently stored, and
   a multipurpose internet mail extensions (MIME) type of the object.

7. The computer-implemented method of claim 1, wherein the ANN is trained using training data and manual annotations.

8. The computer-implemented method of claim 1, wherein the predetermined mapping is adjusted dynamically based on machine learning.

9. The computer-implemented method of claim 1, wherein implementing the physical protection level for the object includes storing the object within the system, utilizing a data storage technique associated with the physical protection level.

10. The computer-implemented method of claim 9, wherein the data storage technique includes a type of hardware RAID to be used to store the object.

11. The computer-implemented method of claim 9, wherein the data storage technique includes a type of software RAID to be used to store the object.

12. The computer-implemented method of claim 9, wherein the data storage technique includes a type of erasure code to be used to store the object as well as hardware storage necessary to implement the type of erasure code.

13. A computer program product for protecting data at an object level, the computer program product comprising a computer readable storage medium having program instructions embodied therewith, wherein the computer readable storage medium is not a transitory signal per se, the program instructions executable by a processor to cause the processor to perform a method comprising:
   identifying an object within a system, utilizing the processor;
   extracting metadata associated with the object by identifying one or more characteristics of the object, utilizing the processor;
   providing as input, to an artificial neural network (ANN), the metadata associated with the object, utilizing the processor;
   receiving as output, from the ANN, a logical protection level for the object, utilizing the processor;

identifying a predetermined mapping between the logical protection level and a physical protection level, utilizing the processor;

identifying, utilizing the processor, the physical protection level for the object within the system, based on the predetermined mapping; and implementing, via data storage techniques including a hardware level of protection and a software level of protection, the physical protection level for the object within the system, utilizing the processor and the logical protection level for the object.

14. The computer program product of claim 13, wherein implementing the physical protection level includes storing the object within the system, using a data storage technique having a predetermined hardware level of protection and a predetermined software level of protection.

15. The computer program product of claim 14, wherein the predetermined hardware level of protection includes a RAID configuration, and the predetermined software level of protection includes an erasure code.

16. A system, comprising:
a hardware processor; and
logic integrated with the hardware processor, executable by the hardware processor, or integrated with and executable by the hardware processor, the logic being configured to:
identify an object within a system;
extract metadata associated with the object by identifying one or more characteristics of the object;
provide as input, to an artificial neural network (ANN), the metadata associated with the object;
receive as output, from the ANN, a logical protection level for the object;
identify a predetermined mapping between the logical protection level and a physical protection level;
identify the physical protection level for the object within the system, based on the predetermined mapping; and
implement, via data storage techniques including a hardware level of protection and a software level of protection, the physical protection level for the object within the system, based on the logical protection level for the object.

* * * * *